United States Patent
Chhabra et al.

(10) Patent No.: US 11,443,035 B2
(45) Date of Patent: Sep. 13, 2022

(54) BEHAVIORAL USER SECURITY POLICY

(71) Applicant: McAfee, LLC, San Jose, CA (US)

(72) Inventors: Nitin Chhabra, Bangalore (IN); Prashanth Palasamudram Ramagopal, Portland, OR (US); Ghanashyam Satpathy, Bangalore (IN); Chakradhar Kotamraju, Kapra (IN); Rajat Saxena, Bangalore (IN)

(73) Assignee: McAfee, LLC, San Jose, CA (US)

( * ) Notice: Subject to any disclaimer, the term of this patent is extended or adjusted under 35 U.S.C. 154(b) by 376 days.

(21) Appl. No.: 16/382,349

(22) Filed: Apr. 12, 2019

(65) Prior Publication Data

US 2020/0327222 A1   Oct. 15, 2020

(51) Int. Cl.
*H04L 9/40* (2022.01)
*G06F 21/55* (2013.01)
*G06N 20/00* (2019.01)

(52) U.S. Cl.
CPC .......... *G06F 21/552* (2013.01); *G06F 21/554* (2013.01); *G06N 20/00* (2019.01); *H04L 63/0421* (2013.01); *H04L 63/20* (2013.01); *G06F 2221/034* (2013.01)

(58) Field of Classification Search
CPC ...... G06F 21/552; G06F 21/554; G06F 21/56; G06F 2221/034; H04L 63/0421; H04L 63/20; H04L 63/1441; H04L 67/02; H04L 67/306; H04L 2463/144; G06N 20/00
See application file for complete search history.

(56) References Cited

U.S. PATENT DOCUMENTS

| | | | | |
|---|---|---|---|---|
| 2012/0137367 A1* | 5/2012 | Dupont | ................... | G06F 21/00 726/25 |
| 2012/0210388 A1* | 8/2012 | Kolishchak | ........... | G06F 21/552 726/1 |
| 2012/0278886 A1* | 11/2012 | Luna | ....................... | H04W 4/50 726/22 |
| 2013/0178195 A1* | 7/2013 | Luna | ..................... | H04W 28/06 455/414.1 |
| 2016/0050226 A1* | 2/2016 | Bettini | .................. | H04L 63/105 726/1 |
| 2018/0357422 A1* | 12/2018 | Telang | .................. | G06F 21/577 |
| 2019/0121978 A1* | 4/2019 | Kraemer | ............... | G06F 21/565 |
| 2019/0179712 A1* | 6/2019 | Snyder | ................ | G06F 11/1464 |

* cited by examiner

*Primary Examiner* — Khoi V Le
(74) *Attorney, Agent, or Firm* — Patent Capital Group

(57) ABSTRACT

There is disclosed in one example a computing apparatus, including: a hardware platform including at least a processor and a memory; and a security agent including instructions encoded in the memory to instruct the processor to: monitor a user's operation of the computing apparatus over time, including determining whether a selected behavior is a security risk; provide a risk analysis of the user's operation based at least in part on the monitoring; select a scan sensitivity based at least in part on the risk analysis; and scan, with the selected sensitivity, one or more objects on the computing apparatus to determine if the one or more objects are a threat.

20 Claims, 7 Drawing Sheets

BEHAVIORAL USER SECURITY POLICY

FIELD OF THE SPECIFICATION

This disclosure relates in general to the field of computer security, and more particularly, though not exclusively, to a system and method for providing a behavioral user security policy.

BACKGROUND

Modern computers often have always-on Internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
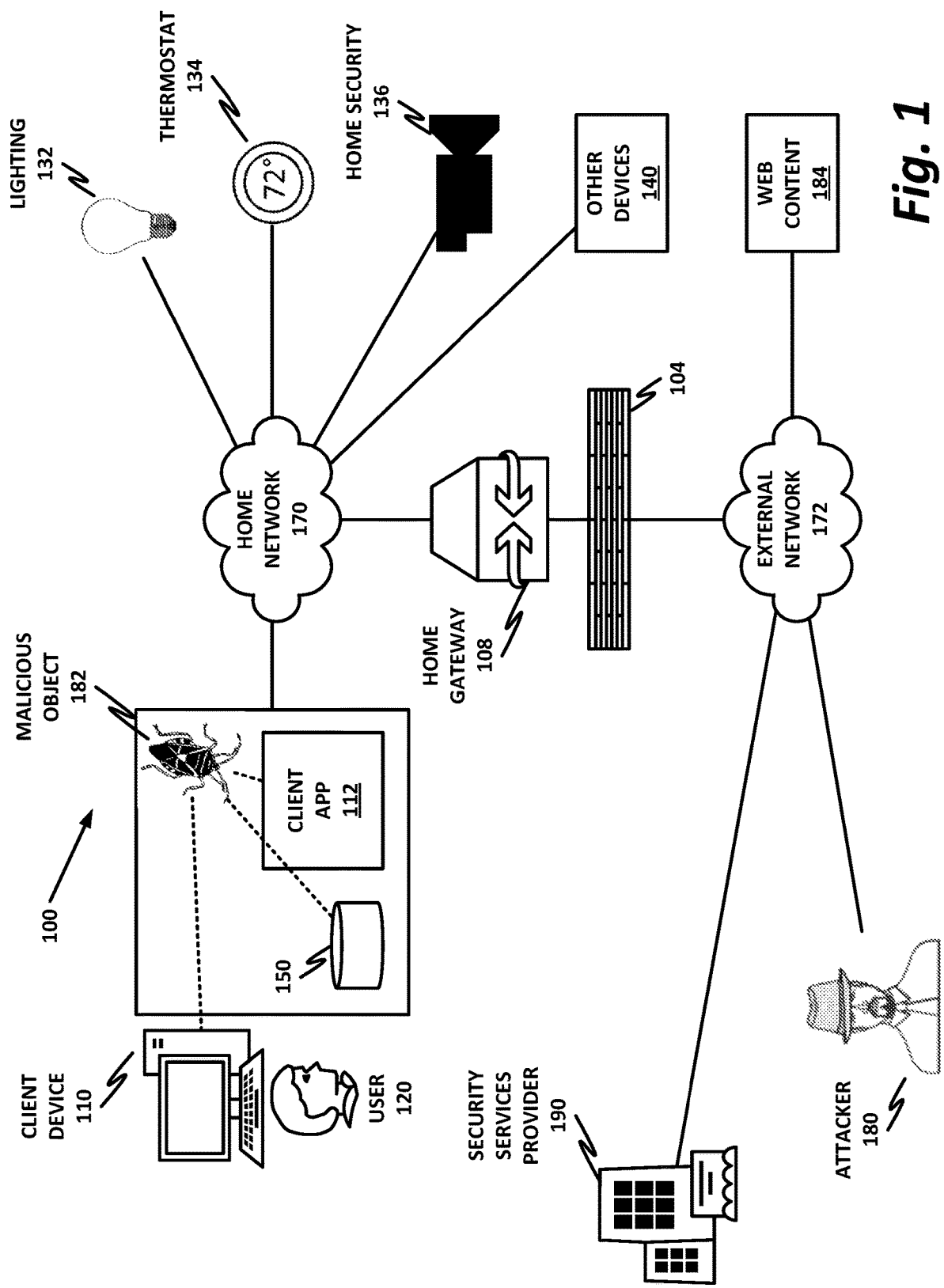
FIG. 1 is a block diagram of a home network.

In an example, there is disclosed a computing apparatus, comprising: a hardware platform including at least a processor and a memory; and a security agent comprising instructions encoded in the memory to instruct the processor to: monitor a user's operation of the computing apparatus over time, comprising determining whether a selected behavior is a security risk; provide a risk analysis of the user's operation based at least in part on the monitoring; select a scan sensitivity based at least in part on the risk analysis; and scan, with the selected sensitivity, one or more objects on the computing apparatus to determine if the one or more objects are a threat.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A security agent could include an antivirus or anti-malware program, ad blocker, or other program designed to protect a user's security and privacy. Many enterprises deploy a security agent on each user device as a matter of policy, and many individual users deploy such a security agent to help ensure that their data are not compromised. Indeed, some contemporary operating systems provide their own built-in security agents.

One function of a security agent is to scan objects such as files, web addresses, downloads, macros, or other objects to determine whether the object is dangerous. Historically, such a scan would include taking a hash of the object under analysis, and comparing that hash to the hashes of many known malware objects. While this method is very effective in identifying instances of known malware, clever malware authors have found workarounds to this, such as by making minor modifications, launching zero-day exploits, or otherwise obfuscating the identity of their malware objects so that it is more difficult for security agents to detect them. Thus, more sophisticated contemporary security agents use techniques such as fuzzy hashing, machine learning, deep static analysis, disassembly, and others to not only identify objects that are exact matches of known malware, but also to identify objects that "look" like they probably are malware. If an object is identified as likely being malware, then it can be quarantined, sandboxed, deleted, subjected to further analysis, or otherwise subjected to some responsive security action.

One difficulty in performing such fuzzy matching is selecting the appropriate matching threshold, or in other words, the aggressiveness with which the security agent identifies objects as being malware or potentially malware. A very aggressive security agent with a low threshold for malware matching will be successful in identifying almost all instances of malware as being malware. But this aggressive setting may also result in a high number of false positives. False positives can be frustrating for the end user, because they may interrupt the end user in doing things that he or she wants to do, or otherwise disrupt the user's operation of the device. A higher threshold for malware matching may result in much fewer false positives, but may also result in the security agent missing one or more actual malware files. This can be dangerous because it can result in malware being installed and run on the user's machine, leading to loss of functionality, loss of data, or other dangerous results.

Some existing security software includes a configurable setting for a user or security administrator to set the sensitivity level of the malware scanner. Depending on the environment, this can be configured by the end user himself or herself, or by an IT department as a single policy for an entire group or enterprise. While this adjustability can be desirable, it can also result in security flaws. For example, if an individual user is configuring his own settings, he may be unaware of what constitutes risky behavior. In this case, the end user may be considered to be not a security expert, and is only making a best guess as to the optimal security setting. On the other hand, if the policy is set by an IT department with security professionals, it is still not necessarily feasible, from a resource overhead perspective, to track each user's activity and make an assessment of the ideal security policy for each user. Rather, security policies are applied en gros to the entire organization, without any accommodation for varying levels of risk among different users. For example, some users exhibit riskier computer usage behavior than other users. This may be because of the user's habits, or because the user has a different function within the enterprise and must use a computer in a different way.

This difficulty can be compounded in so-called bring your own device (BYOD) situations. BYOD is popular in many modern enterprises, because it enables the enterprise to save on IT costs. When users bring their own devices, the enterprise is not required to purchase and configure devices for each individual user. It is also popular with users, because many of them like to have their own smart phones and laptops for personal use, and having a separate smart phone or laptop for enterprise use can be redundant and unnecessary. So in the BYOD context, a user may provide his or her own personal computing device, and the enterprise may install on the device software such as a security agent to ensure that enterprise-grade security is maintained, a virtual private network (VPN) that may be used to control access to enterprise network resources and to ensure that there is not cross-contamination between enterprise resources and personal resources, and other enterprise software that may be useful in facilitating the BYOD model. The trade-off for the BYOD model is the loss of very tight control over the users' operation of their devices. When the enterprise provides all users with enterprise-owned, controlled, and configured devices, the enterprise can have very strict policies, such as restricting the installation or operation of non-authorized programs. However, in a BYOD model, users need to have the flexibility to install and configure their own software on their devices. Thus, in a traditional model, the enterprise can maintain security simply by whitelisting all installed programs, and ensuring that users are locked out from installing non-whitelisted software. This can be considered to be an extreme example of security sensitivity. At the other extreme, a user may have a personal device with a security agent, and may be frustrated if the security agent too frequently identifies benign programs as malware. In that case, the user could set the security agent to extreme insensitivity, which could expose the user to risk.

The present specification provides a security agent, or an auxiliary program or circuit to a security agent, that analyzes a user's behavior and performs a user risk assessment. Based on the user's risk assessment, the sensitivity of security scans can be automatically configured to offer the user optimal protection with limited interruption to the user's use and enjoyment of the device. After assessing the risk level of each user, the risk level can be used to automatically configure an aggressiveness level of security agent protection on an individual, per-user basis.

Embodiments of the present specification include determining a risk profile of a computer user, using machine learning or heuristics algorithms. These can be based, for example, on the user's browser history and settings. The user browser habits may be an important indicator of the risk posed to the system. Thus, a host-based or remote component may periodically scan the user's browser history, including parameters such as sites visited, reputations for those sites, cookies, security settings, use of "incognito mode," and other parameters. These can be provided to a machine learning or heuristics model. A machine learning or heuristic risk classifier can then use the user profile risk to assign a risk level, such as low, medium, or high, or a more graded level based on an integer or decimal value. This information may then be used, for example, to set scan aggressiveness based on the risk assessment.

The operation of a security agent according to the present specification can be illustrated by the example of three fictional users, whose use of their devices may influence an automatic security setting. It should be understood that the illustration of these three users is provided to aid in the understanding of the teachings herein, but these should not be understood to be exclusive of, or to define any specific limits of, the teachings of the specification or the appended claims. For ease of reference, these users will be referred to as "Jonathan," "Mary," and "Stephen."

User Jonathan is a corporate accountant for a major software vendor. Jonathan's device is a desktop computer that is provided and managed by the enterprise. The enterprise has a corporate IT policy that allows only certain whitelisted programs to be installed on the computer, and the enterprise provides industrial-grade firewalls and other security measures. Jonathan's desktop machine always stays in his office, has an encrypted hard drive, and has only software provided directly by the enterprise. Jonathan rarely, if ever, needs to download new software because the enterprise-provided software is sufficient for him to perform his work functions. In this example, Jonathan may be considered to be a "low-risk" user. Jonathan's use of his desktop machine provides very few attack vectors for malware authors, and Jonathan is unlikely to infect his machine by his own usage. Furthermore, Jonathan visits primarily work-related websites while using his machine, although he occasionally visits well-known and reputable news and travel sites. Thus, a security agent on Jonathan's machine may analyze the sites Jonathan visits, the reputations of those sites, his cookies, and his security settings, and determine that Jonathan is a low-risk user. The security agent may therefore apply a non-aggressive setting in performing security scans of Jonathan's computer. For example, the security agent may be configured to perform a daily security scan of all files on the machine. Because Jonathan is a very low-risk user, the danger of false positives may be deemed to outweigh the danger of infection. Thus, the security agent may match or tag a file as potentially malware only if there is a strong match to a known malware object.

User Mary works for the same major software vendor as Jonathan, and is a software engineer. Because Mary is also an avid gamer, she prefers to take advantage of the enterprise's BYOD policy. Mary has a high-end gaming laptop that has plenty of storage and capacity for both her personal use and her corporate use. Mary's high-end laptop has a VPN that allows her to access enterprise resources, and also has plenty of personal data and software. In addition to her work duties, Mary enjoys visiting gaming websites, and often downloads games or other software or utilities that she finds useful. However, Mary primarily downloads content from reputable websites, and does not tend to visit risky websites. In this example, a security agent may analyze Mary's sites visited, the reputations of her visited sites, cookies, and security settings, and determine that Mary's use is medium-risk. Although Mary primarily interacts with reputable websites, she does download more unknown software than Jonathan, and her use of the machine presents somewhat more attack vectors for a malware author. In this case, the security agent may take a balanced approach by setting a medium sensitivity to its file scan. For example, a file may be marked as potentially malware if it is more likely than not to match a known malware object.

User Stephen is not an enterprise user. He has a security agent installed on his personal machine. Stephen is a 16-year-old gamer and typical teenager. Stephen's machine is not the subject of an enterprise IT policy, and does not sit behind a strong corporate firewall. Similar to Mary, Stephen is an avid gamer. But Stephen is also easily bored, and likes to try lots of different games at different times. Stephen frequently downloads software, games, and other utilities from lots of different websites, without regard to their reputation or legitimacy. Furthermore, as a teenager with poor judgment, Stephen often uses his device to visit questionable websites. Because he does not want his parents or others to see the questionable websites that he visits, Stephen often uses his browser's incognito mode to ensure that the device keeps no record of his usage. In this example, the security agent may analyze the sites that Stephen visits, the reputations of those sites, his cookies, his lax security settings, and his frequent use of incognito mode to determine that Stephen is a high-risk user. Stephen provides many vectors for malware authors to attack his machine, and overall exhibits poor security awareness. Thus, there is an elevated danger that Stephen's machine will be infected with a malware object. To mitigate this danger, the security agent may apply a strict or aggressive setting to its malware matching algorithm. This is because the risk of infection on Stephen's machine is very high, and may generally be considered to outweigh the danger of false positives. Note that Stephen may still have the option of overwriting a security warning that indicates an object may be malware and installing the object, anyway.

In some embodiments, a security agent may provide anonymous usage and statistic data to a security services provider, such as a software vendor that provides the security agent. The security services provider could maintain a global database that matches certain behaviors with risk of infection. For example, Stephen's frequent use of incognito mode to visit questionable websites may, along with the decision to override security warnings, result in infection of his machine. These data can be used to correlate risk of infection with similar behavior in other users. This can be used to improve the user behavior models and to make better assessments of risk. It should also be noted that, while in this example a three-tiered enumerated risk is illustrated, other models are possible. For example, other enumerated risk values could be used with more degrees of granularity. In other cases, a risk could be computed as a decimal or integer value, with certain thresholds being assigned to scanning behaviors. Furthermore, as the user operates the machine, an internal host-side model may continuously monitor the behavior and update heuristic algorithms or apply machine learning to further refine its analysis of the user behavior. In some cases, the user's behavior could be divided into certain "profiles," with riskier behavior being associated with a riskier profile and lower-risk behavior being associated with a lower-risk profile. For example, Stephen visiting reputable websites could trigger entry into a medium-risk profile for Stephen, and could result in medium-aggressiveness scanning by the security agent while that profile is active. Once Stephen visits a less-reputable website or enters incognito mode, this could trigger a higher-risk profile. In the high-risk profile, very aggressive scanning is used. In the case of regularly-scheduled scans, such as daily scans, the highest-risk profile associated with that user may be applied to ensure a safe scan.

A system and method for providing a behavioral user security policy will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a home network 100. Embodiments of home network 100 may be configured or adapted to provide the method of providing a behavioral user security policy as disclosed in the present specification.

In the example of FIG. 1, home network 100 may be a "smart home" with various Internet of things (IoT) devices that provide home automation or other services. Home network 100 is provided herein as an illustrative and non-limiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 100, one or more users 120 operate one or more client devices 110. User 120 may be, for example, one of the users discussed above (Jonathan, Mary, or Stephen), or any other user. User 120 may wish to access web content 184 via external network 172. Accessing web content 184 may, in some cases, expose client device 110 to malicious objects 182, and/or to attacks by attacker 180. It is, therefore, desirable for a security agent such as a client app 112 to protect client device 110 from malicious objects 182 and from attacker 180. A single user 120 and single client device 110 are illustrated here for simplicity, but a home or enterprise may have multiple users, each of which may have multiple devices.

Figure 2:
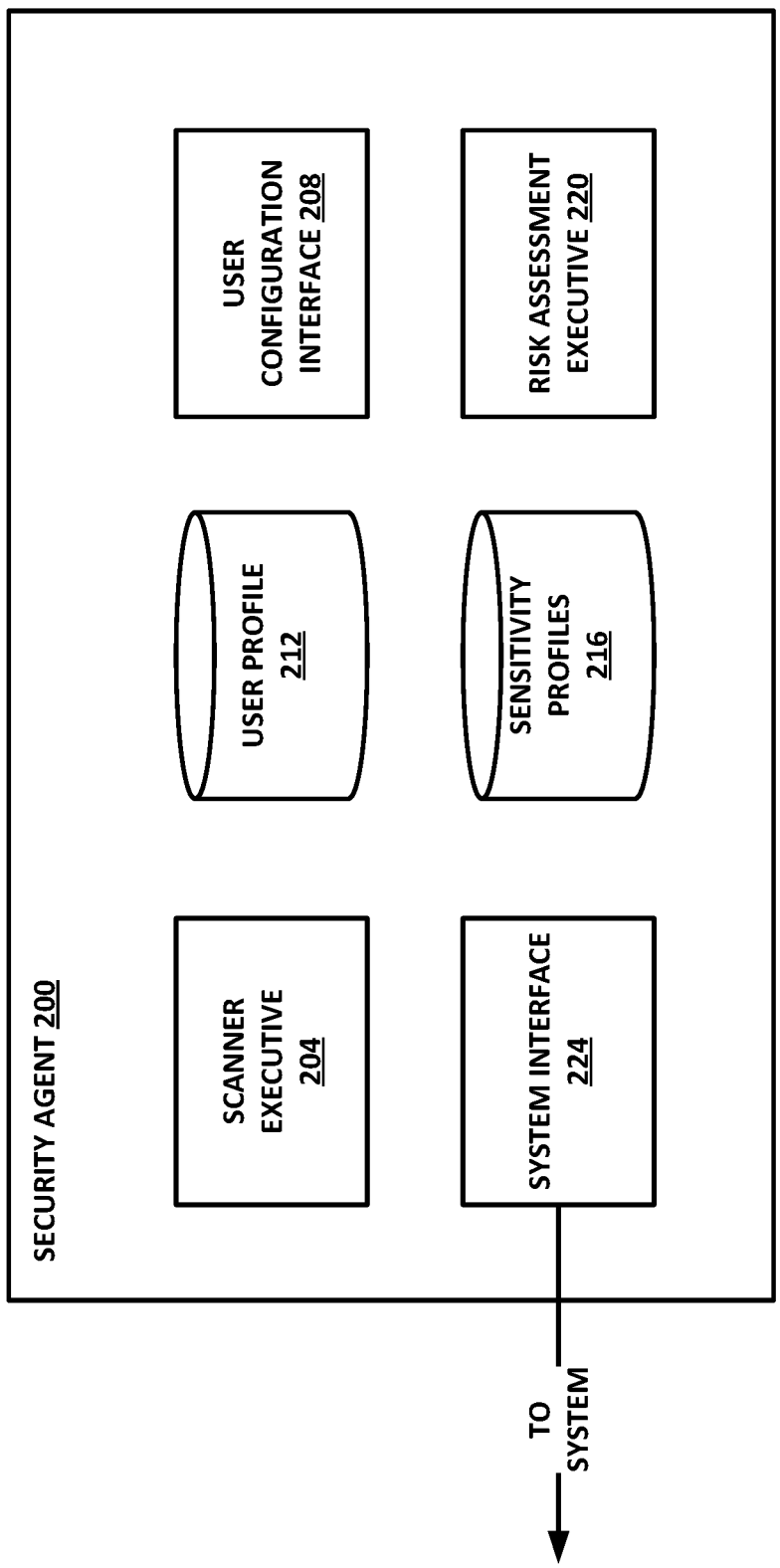
FIG. 2 is a block diagram of a security agent.

Client app 112 may be a security solution such as McAfee Real Protect, which may provide to the user the ability to specify a sensitivity level for scanning. However, as discussed above, the user's own selection may not be optimal, and the security agent may not know whether the choice is best for the user, with respect to detection efficiency and protection. Thus, the security agent may be modified as illustrated in FIG. 2, to include risk assessment capabilities to determine an optimal sensitivity for scanning.

This provides smarter security solutions, with the ability to automatically determine the risk assessment of the user and system. This information can then be used by the security agent to adjust the scan aggressiveness to a preferred value for client device 110 as operated by user 120.

Multiple client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions running on client devices 110.

In this illustration, home network 170 is shown as a single network for simplicity, but in some embodiments, home network 170 may include any number of networks, such as one or more intranets connected to the Internet. Home network 170 may also provide access to an external network, such as the Internet, via external network 172. External network 172 may similarly be any suitable type of network.

Home network 170 may connect to the Internet via a home gateway 108, which may be responsible, among other things, for providing a logical boundary between home network 172 and external network 170. Home network 170 may also provide services such as dynamic host configuration protocol (DHCP), gateway services, router services, and switching services, and may act as a security portal across home boundary 104.

Home network 100 may also include a number of discrete IoT devices, which in contemporary practice are increasing regularly. For example, home network 100 may include IoT functionality to control lighting 132, thermostats or other environmental controls 134, a home security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Home network 100 may communicate across home boundary 104 with external network 172. Home boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 100, such as security software, security updates, network appliances, or similar. For example, MCAFEE, LLC. provides a comprehensive suite of security services that may be used to protect home network 100.

It may be a goal of user 120 of home network 100 to successfully operate client devices 110 and IoT devices without interference from attacker 180 or from unwanted security objects. In one example, attacker 180 is a malware author whose goal or purpose is to cause malicious harm or mischief, for example, by injecting malicious object 182 into client device 110. According to embodiments of the present specification, malicious object 182 may include a fileless attack or a living off the land attack. Fileless attacks or living off the land attacks may be considered security threats or attacks, by way of nonlimiting example. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to home resources. Client application 112 may include, for example, a security agent that protects client device 110 from malicious objects 182, and/or from attacker 180. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass user 120. Thus, one aim of attacker 180 may be to install his malware on one or more client devices 110 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 100 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC. Security services provider 190 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

FIG. 2 is a block diagram of a security agent 200. Security agent 200 may be provided as a software package that runs on a user device. In other embodiments, security agent 200 could be embodied as one or more tangible, non-transitory computer-readable mediums having stored thereon executable instructions to instruct a processor to provide security agent 200. In other embodiments, security agent 200 could be executed on a coprocessor, a digital signal processor (DSP), a field-programmable gate array (FPGA), a systemon-a-chip, or a support circuit, or could be provided remotely, wholly or in part. Note that, for purposes of illustration, the various components of security agent 200 are shown here as part of a monolithic unit. However, this need not be the case. In some embodiments, security agent 200 could split various functions between different components, such as software running on a processor and a support circuit or coprocessor. Furthermore, some portions of security agent 200 could be provided in a neural network, on a remote server, in an accelerator, or in other hardware or software combinations. The examples illustrated in the present specification are illustrated primarily with respect to an embodiment wherein security agent 200 is a software routine that runs on a client device. While this embodiment illustrates one very useful configuration, it is nonlimiting, and other configurations are also encompassed within the scope of the present specification. One purpose of security agent 200 is to scan objects on a device such as client device 110 of FIG. 1 or any of the other devices illustrated throughout this specification, including hardware platform 500, platform 602, and CPU 712.

Security agent 200 includes a system interface 224, which allows security agent 200 to access system resources. This can include, for example, inspecting network sockets to analyze network activity in real-time, and an access to the hard disk to analyze static files on the hard disk. Security agent 200 may be configured both to provide real-time protection by monitoring the user's real-time activity, as well as to perform scheduled functions, such as periodic scans. For example, the user may configure security agent 200 via user configuration interface 208 to scan the device daily, weekly, or on some other useful schedule. User configuration interface 208 can include both a local interface such as a graphical user interface (GUI), or a remote configuration interface that can be programmed remotely, such as by an enterprise security administrator. Thus, security agent 200 can be usable both in a personal user device or in an enterprise device, depending on the configuration.

Security agent 200 includes a scanner executive 204 that carries out the actual scanning of files and data, either in real-time or as scheduled.

Security agent 200 may also include one or more data stores, including, for example, a user profile 212 and a sensitivity profile 216. User profile 212 may include data collected about the user's operation of the machine, including by way of nonlimiting example, sites visited, reputation of sites visited, stored cookies, the user's network and device security settings, the frequency with which the user uses incognito mode, the frequency with which the user downloads new programs, the reputation of downloaded programs, and any other information that may be useful in generating and storing a user profile. Risk assessment executive 220 may use user profiles 212 to perform a risk assessment on the user, and to select from sensitivity profiles 216 an appropriate sensitivity profile for the user's operation of the device. Depending on the configuration, risk assessment executive 220 may even be able to override a user sensitivity setting provided via user configuration interface 208.

Figure 3:
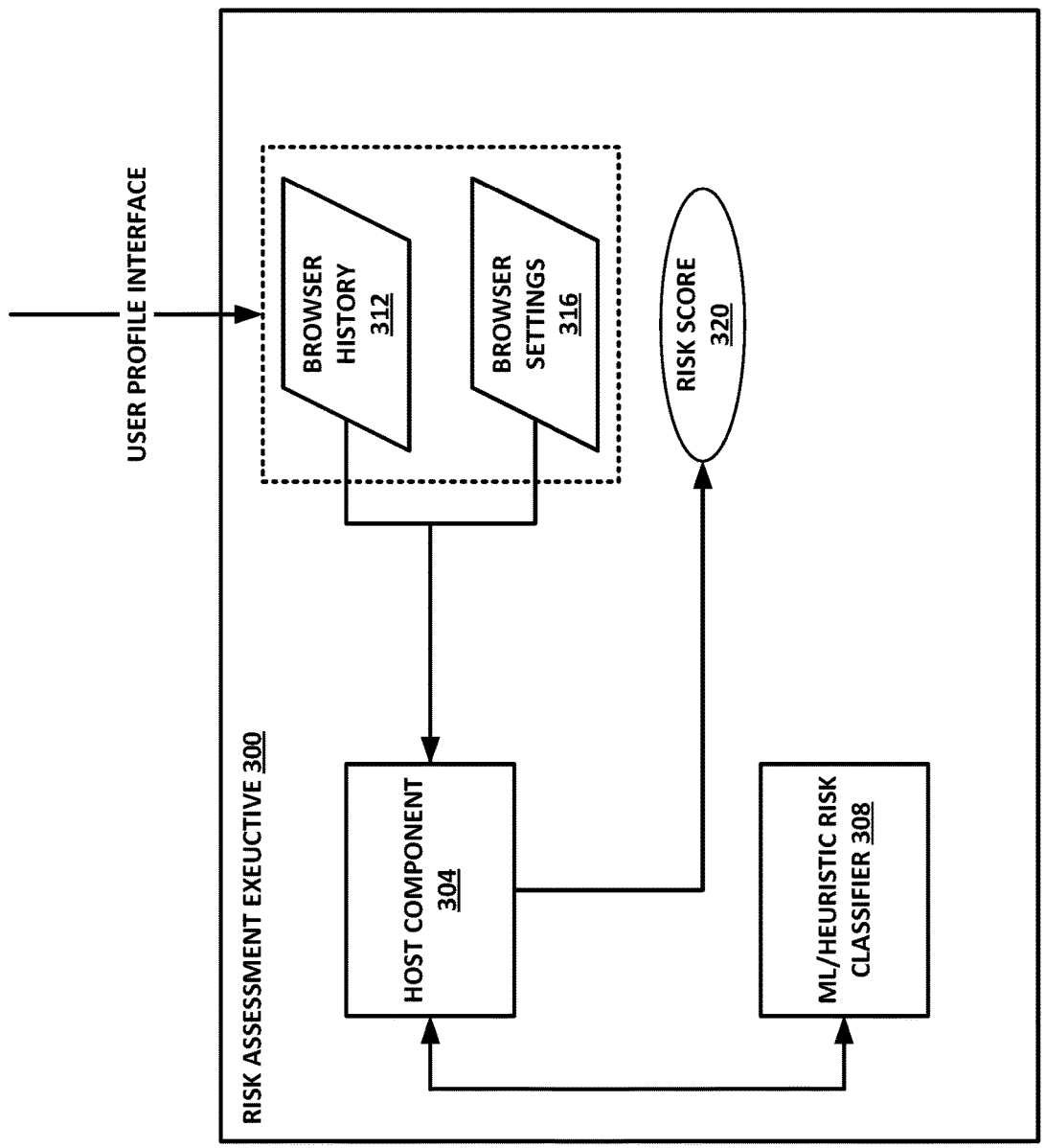
FIG. 3 is a block diagram of a risk assessment executive.

FIG. 3 is a block diagram of a risk assessment executive 300. Risk assessment executive 300 may be an embodiment of risk assessment executive 220 of FIG. 2, or could be a separate module. As with security agent 200 of FIG. 2, risk assessment executive 300 of FIG. 3 may be embodied in hardware, software, firmware, or some combination thereof. Furthermore, certain functions may be provided either remotely or locally as appropriate to the specific embodiment.

Risk assessment executive 300 includes a user profile interface that allows risk assessment executive 220 to access a user profile, such as user profile 212 of FIG. 2. This enables risk assessment executive 300 to receive data such as the user's browser history 312 and browser settings 316, along with other user data that may be relevant to risk assessment. These user data are provided to a host component 304 that periodically scans the user profile data and other settings, and may collect and aggregate them. Host component 304 then provides the data to a machine learning/heuristic risk classifier 308. Risk classifier 308 employs a machine learning algorithm, heuristics, or other suitable algorithm to assess the user's risk based on the usage collected from the user profile interface. The risk classifier 308 may then return a risk assessment to host component 304, which then assigns a risk score 320 to the user's operation of the machine. As illustrated above, the risk score could be an enumerated risk score such as high, medium, or low. In other embodiments, enumerations with greater or lower granularity may be used, or risk score 320 could be an integer or a floating-point score that can be proved as compared to certain thresholds that may be stored, for example, with sensitivity profiles 216 of FIG. 2. Risk score 320 may be used to assign an appropriate sensitivity to a module such as scanner executive 204 of FIG. 2. This enables the scanner executive to appropriately adjust its sensitivity of detection with either greater weight toward detection or toward false positives, or toward some other sensitivity factor that may be relevant to the scan.

Figure 4:
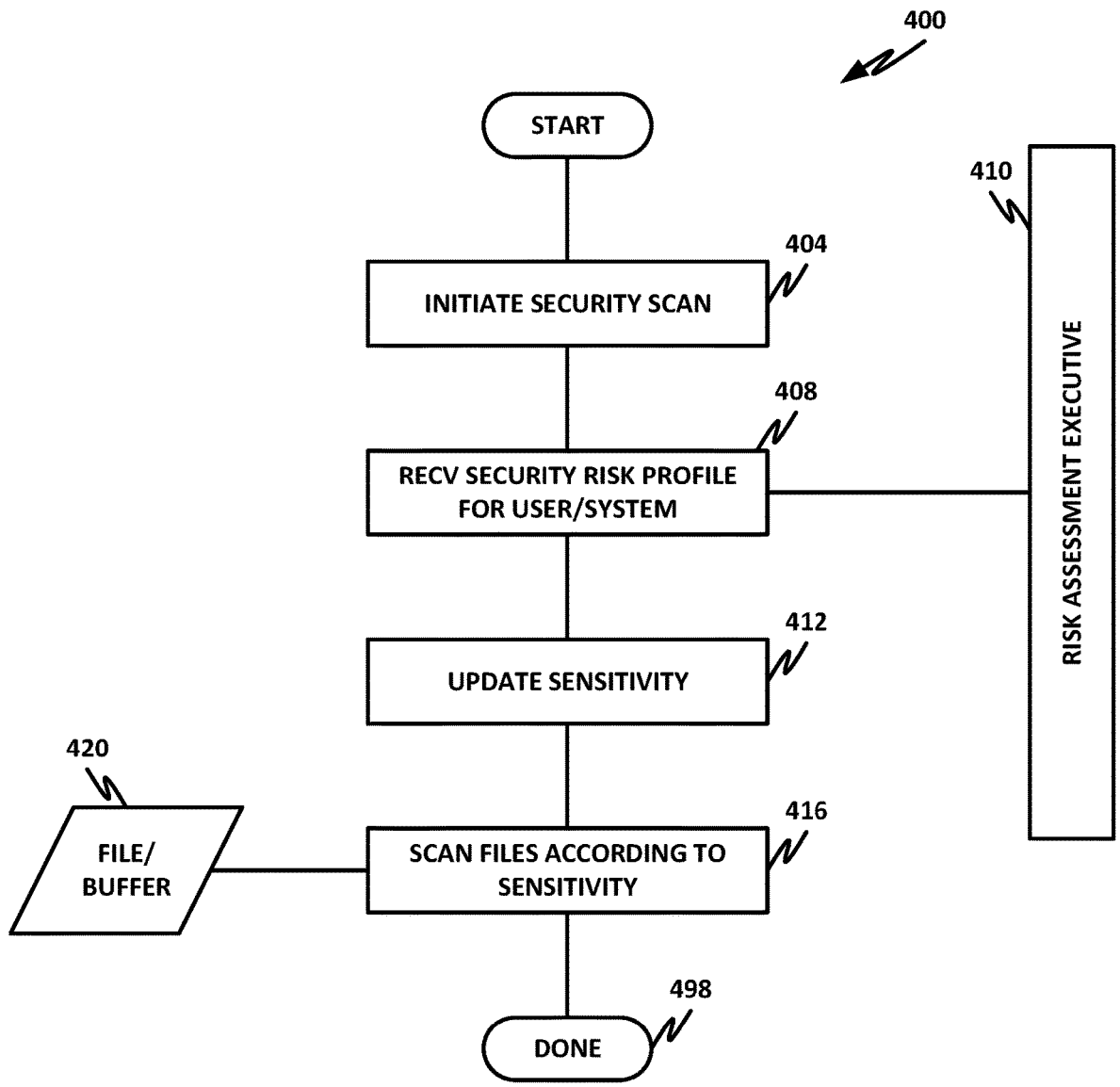
FIG. 4 is a flowchart of a method that may be carried out by a security agent.

FIG. 4 is a flowchart of a method 400 that may be carried out by a security agent.

Starting in block 404, the security agent initiates a security scan, for example, of a file or buffer 420.

After initiation of the scan, the security agent queries the risk assessment executive 410 for a user security profile. Risk assessment executive 410 may be, for example, a risk assessment executive 300 of FIG. 3, a risk assessment executive 220 of FIG. 2, a combination of the two, or some other suitable risk assessment executive. The risk assessment executive 410 determines, based on heuristics, machine learning, the user's current profile, and other data, an appropriate risk level for the current user of the current machine.

In block 412, the security agent updates its sensitivity based on data returned by risk assessment executive 410.

In block 416, the security agent scans the files, buffers, file system, network traffic, or other real-time or static data according to the current sensitivity, which is based on the risk assessment. In scanning files, the security agent may occasionally identify a file or object that is determined to be either definitively malware or potentially malware. Depending on that determination, the security agent may take appropriate action, such as notifying the user, notifying a security administrator, notifying a security services provider, quarantining the object, sandboxing the object, deleting the object, initiating a further scan for damage caused by the object, or taking other remedial or mitigation action to mitigate damage that may be performed by the malicious or potentially malicious object. That remedial or mitigation action may broadly be referred to as a security action, and should be understood to broadly encompass any action taken in response to identifying an object as malware or potentially malware, and designed to mitigate the effect of the malware or potential malware object.

Figure 5:
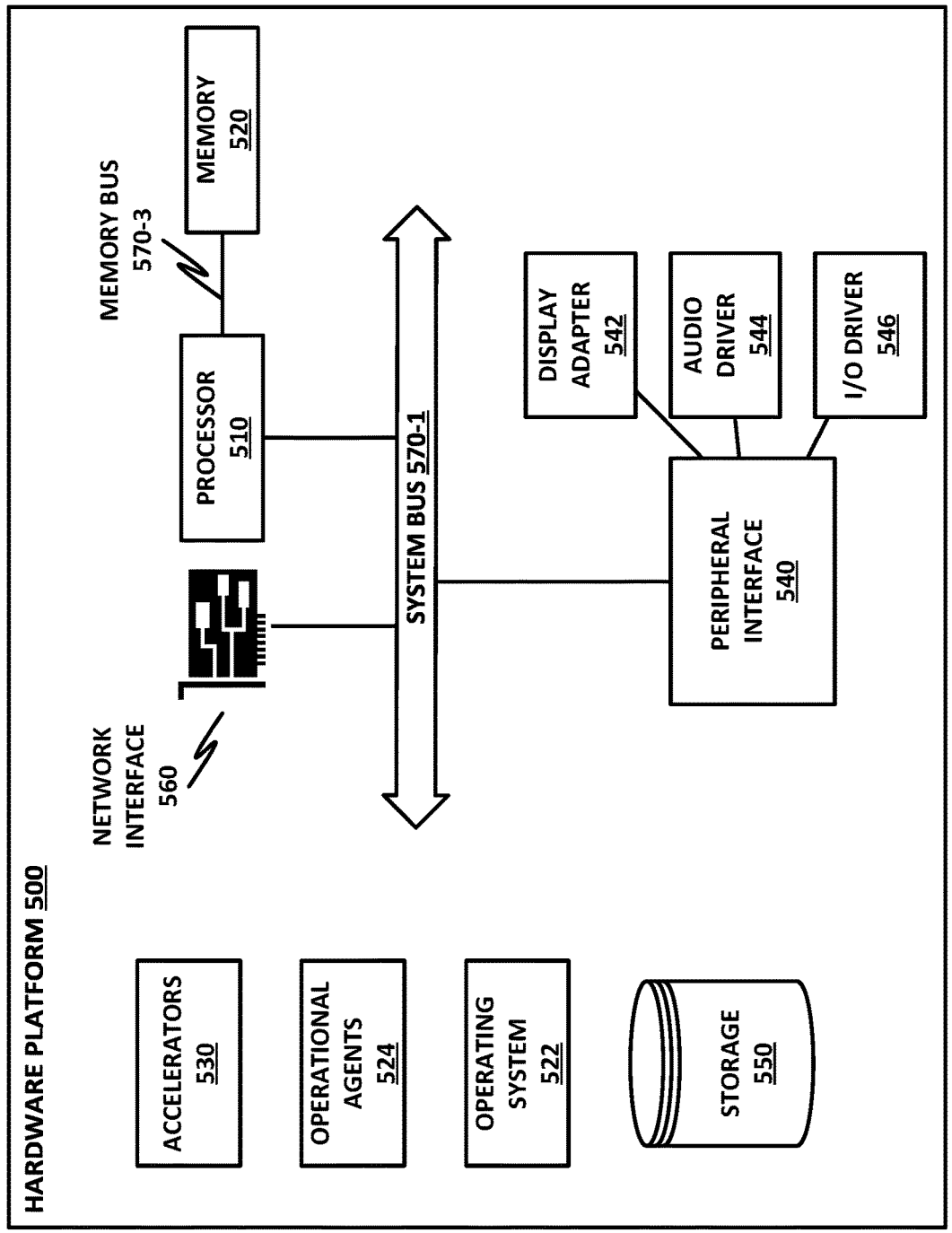
FIG. 5 is a block diagram of a hardware platform.

FIG. 5 is a block diagram of hardware platform 500. Embodiments of hardware platform 500 may be configured or adapted to provide the method of providing a behavioral user security policy as disclosed in the present specification.

Hardware platform 500 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it, including any device hosted on the same hardware but that is logically separated (e.g., a different virtual machine, container, or guest) may be designated as a "remote host."

In certain embodiments, client devices 110, home gateway 108, and the IoT devices illustrated in FIG. 1 may all be examples of devices that run on a hardware platform such as hardware platform 500. FIG. 5 presents a view of many possible elements that may be included in a hardware platform, but it should be understood that not all of these are necessary in every platform, and platforms may also include other elements. For example, peripheral interface 540 may be an essential component in a user-class device to provide input and output, while it may be completely unnecessary in a virtualized server or hardware appliance that communicates strictly via networking protocols.

By way of illustrative example, hardware platform 500 provides a processor 510 connected to a memory 520 and other system resources via one or more buses, such a system bus 570-1 and a memory bus 570-3.

Other components of hardware platform 500 include a storage 550, network interface 560, and peripheral interface 540. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 520 and storage 550, for example, in a single physical memory device, and in other cases, memory 520 and/or storage 550 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 560 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, DSP, FPGA, graphics processing unit, programmable logic array, application-specific integrated circuit, or virtual machine processor. In certain architectures, a multi-core processor may be provided, in which case processor 510 may be treated as only one core of a multi-core processor, or may be treated as the entire multi-core processor, as appropriate. In some embodiments, one or more co-processors may also be provided for specialized or support functions.

Processor 510 may be communicatively coupled to devices via a system bus 570-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 570-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 510 is communicatively coupled to memory 520 via memory bus 570-3, which may be, for example, a direct memory access (DMA) bus, though other memory architectures are possible, including ones in which memory 520 communicates with processor 510 via system bus 570-1 or some other bus. In the same or an alternate embodiment, memory bus 570-3 may include remote direct memory access (RDMA), wherein processor 510 accesses disaggregated memory resources via DMA or DMA-like interfaces.

To simplify this disclosure, memory 520 is disclosed as a single logical block, but in a physical embodiment may include one or more blocks of any suitable volatile or nonvolatile memory technology or technologies, including, for example, double data rate random-access memory (DDR RAM), static random-access memory (SRAM), dynamic random-access memory (DRAM), persistent random-access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 520 may comprise a relatively low-latency volatile main memory, while storage 550 may comprise a relatively higher-latency nonvolatile memory. However, memory 520 and storage 550 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 550 may be any species of memory 520, or may be a separate device. Storage 550 may include one or more non-transitory computer-readable mediums, including, by way of nonlimiting example, a hard drive, solid-state drive, external storage, microcode, hardware instructions, redundant array of independent disks (RAID), NAS, optical storage, tape drive, backup system, cloud storage, or any combination of the foregoing. Storage 550 may be, or may include therein, a database or databases or data stored in other configurations, and may include a stored copy of operational software such as operating system 522 and software portions, if any, of operational agents 524, accelerators 530, or other engines. Many other configurations are also possible, and are intended to be encompassed within the broad scope of this specification.

As necessary, hardware platform 500 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 500 may be configured for virtualization or containerization, in which case it may also provide a hypervisor, virtualization platform, virtual machine manager (VMM), orchestrator, containerization platform, or other infrastructure to provide flexibility in allocating resources.

Network interface 560 may be provided to communicatively couple hardware platform 500 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), VPN, intranet, or any other appropriate architecture or system that facilitates communications in a network or telephonic environment.

Operational agents 524 are one or more computing engines that may include one or more non-transitory computer-readable mediums having stored thereon executable instructions operable to instruct a processor to provide operational functions. At an appropriate time, such as upon booting hardware platform 500 or upon a command from operating system 522 or a user or security administrator, processor 510 may retrieve a copy of operational agents 524 (or software portions thereof) from storage 550 and load it into memory 520. Processor 510 may then iteratively execute the instructions of operational agents 524 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, an FPGA programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 540 may be configured to interface with any auxiliary device that connects to hardware platform 500 but that is not necessarily a part of the core architecture of hardware platform 500. A peripheral may be operable to provide extended functionality to hardware platform 500, and may or may not be wholly dependent on hardware platform 500. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 542, audio driver 544, and input/output (I/O) driver 546. Display adapter 542 may be configured to provide a human-readable visual output, such as a command-line interface (CLI) or graphical desktop such as Microsoft Windows, Apple OSX desktop, or a Unix/Linux X Window System-based desktop. Display adapter 542 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 542 may include a hardware graphics card, which may have its own memory and its own graphics processing unit (GPU). Audio driver 544 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 6:
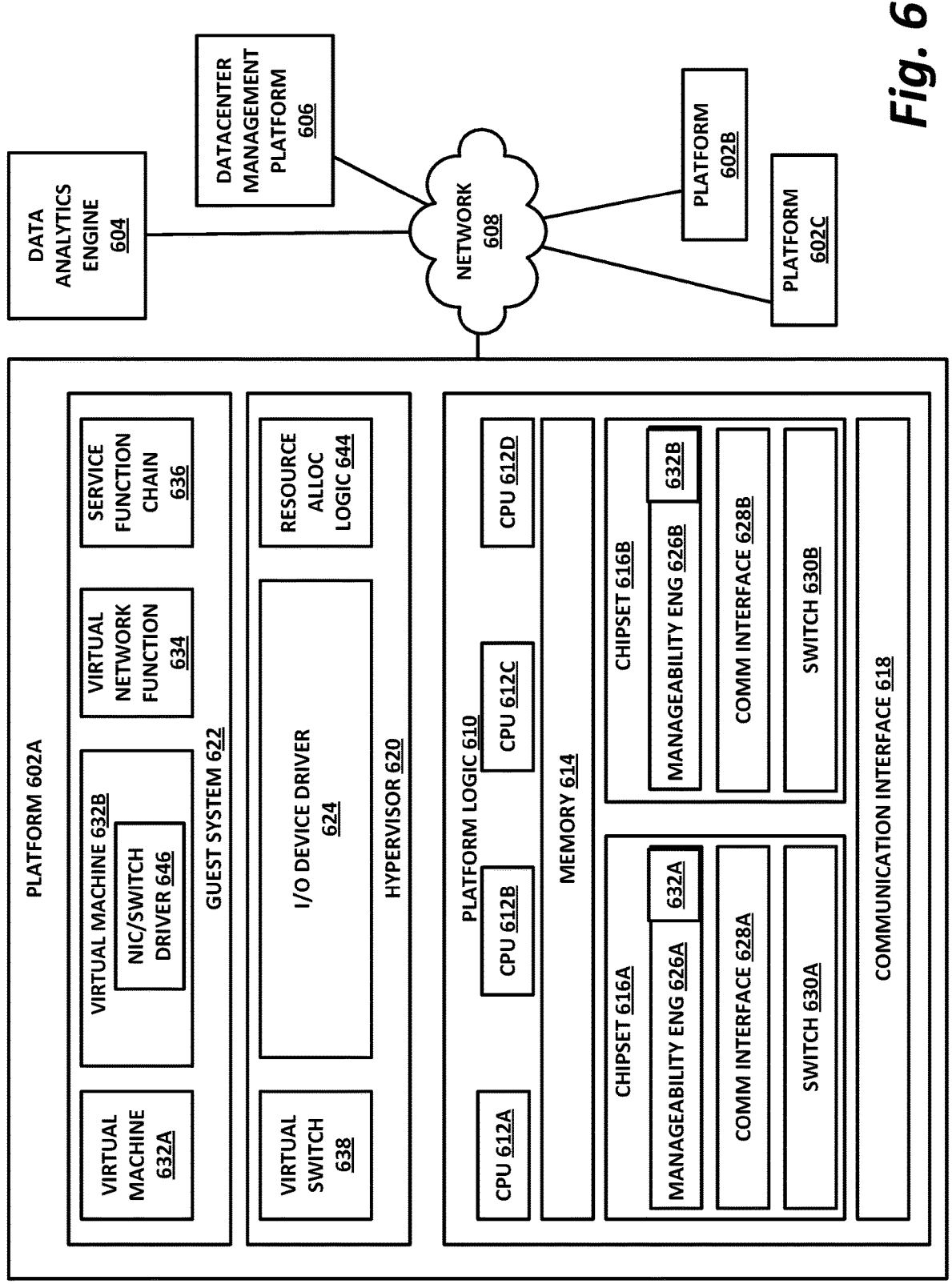
FIG. 6 is a block diagram of components of a computing platform.

FIG. 6 is a block diagram of components of a computing platform 602A. Embodiments of computing platform 602A may be configured or adapted to provide the method of providing a behavioral user security policy as disclosed in the present specification.

In the embodiment depicted, platforms 602A, 602B, and 602C, along with a data center management platform 606 and data analytics engine 604 are interconnected via network 608. In other embodiments, a computer system may include any suitable number (i.e., one or more) of platforms. In some embodiments (e.g., when a computer system only includes a single platform), all or a portion of the system management platform 606 may be included on a platform 602. A platform 602 may include platform logic 610 with one or more central processing units (CPUs) 612, memories 614 (which may include any number of different modules), chipsets 616, communication interfaces 618, and any other suitable hardware and/or software to execute a hypervisor 620 or other operating system capable of executing workloads associated with applications running on platform 602. In some embodiments, a platform 602 may function as a host platform for one or more guest systems 622 that invoke these applications. Platform 602A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 606, hypervisor 620, or other operating system) of computer platform 602A may assign hardware resources of platform logic 610 to perform workloads in accordance with the stress information. In some embodiments, self-diagnostic capabilities may be combined with the stress monitoring to more accurately determine the health of the hardware resources. Each platform 602 may include platform logic 610. Platform logic 610 comprises, among other logic enabling the functionality of platform 602, one or more CPUs 612, memory 614, one or more chipsets 616, and communication interfaces 628. Although three platforms are illustrated, computer platform 602A may be interconnected with any suitable number of platforms. In various embodiments, a platform 602 may reside on a circuit board that is installed in a chassis, rack, or other suitable structure that comprises multiple platforms coupled together through network 608 (which may comprise, e.g., a rack or backplane switch).

CPUs 612 may each comprise any suitable number of processor cores and supporting logic (e.g., uncores). The cores may be coupled to each other, to memory 614, to at least one chipset 616, and/or to a communication interface 618, through one or more controllers residing on CPU 612 and/or chipset 616. In particular embodiments, a CPU 612 is embodied within a socket that is permanently or removably coupled to platform 602A. Although four CPUs are shown, a platform 602 may include any suitable number of CPUs.

Memory 614 may comprise any form of volatile or nonvolatile memory including, without limitation, magnetic media (e.g., one or more tape drives), optical media, RAM, ROM, flash memory, removable media, or any other suitable local or remote memory component or components. Memory 614 may be used for short, medium, and/or long term storage by platform 602A. Memory 614 may store any suitable data or information utilized by platform logic 610, including software embedded in a computer-readable medium, and/or encoded logic incorporated in hardware or otherwise stored (e.g., firmware). Memory 614 may store data that is used by cores of CPUs 612. In some embodiments, memory 614 may also comprise storage for instructions that may be executed by the cores of CPUs 612 or other processing elements (e.g., logic resident on chipsets 616) to provide functionality associated with the manageability engine 626 or other components of platform logic 610. A platform 602 may also include one or more chipsets 616 comprising any suitable logic to support the operation of the CPUs 612. In various embodiments, chipset 616 may reside on the same die or package as a CPU 612 or on one or more different dies or packages. Each chipset may support any suitable number of CPUs 612. A chipset 616 may also include one or more controllers to couple other components of platform logic 610 (e.g., communication interface 618 or memory 614) to one or more CPUs. In the embodiment depicted, each chipset 616 also includes a manageability engine 626. Manageability engine 626 may include any suitable logic to support the operation of chipset 616. In a particular embodiment, a manageability engine 626 (which may also be referred to as an innovation engine) is capable of collecting real-time telemetry data from the chipset 616, the CPU(s) 612 and/or memory 614 managed by the chipset 616, other components of platform logic 610, and/or various connections between components of platform logic 610. In various embodiments, the telemetry data collected includes the stress information described herein.

In various embodiments, a manageability engine 626 operates as an out-of-band asynchronous compute agent which is capable of interfacing with the various elements of platform logic 610 to collect telemetry data with no or minimal disruption to running processes on CPUs 612. For example, manageability engine 626 may comprise a dedicated processing element (e.g., a processor, controller, or other logic) on chipset 616, which provides the functionality of manageability engine 626 (e.g., by executing software instructions), thus conserving processing cycles of CPUs 612 for operations associated with the workloads performed by the platform logic 610. Moreover, the dedicated logic for the manageability engine 626 may operate asynchronously with respect to the CPUs 612 and may gather at least some of the telemetry data without increasing the load on the CPUs.

A manageability engine 626 may process telemetry data it collects (specific examples of the processing of stress information will be provided herein). In various embodiments, manageability engine 626 reports the data it collects and/or the results of its processing to other elements in the computer system, such as one or more hypervisors 620 or other operating systems and/or system management software (which may run on any suitable logic such as system management platform 606). In particular embodiments, a critical event such as a core that has accumulated an excessive amount of stress may be reported prior to the normal interval for reporting telemetry data (e.g., a notification may be sent immediately upon detection).

Additionally, manageability engine 626 may include programmable code configurable to set which CPU(s) 612 a particular chipset 616 will manage and/or which telemetry data will be collected.

Chipsets 616 also each include a communication interface 628. Communication interface 628 may be used for the communication of signaling and/or data between chipset 616 and one or more I/O devices, one or more networks 608, and/or one or more devices coupled to network 608 (e.g., system management platform 606). For example, communication interface 628 may be used to send and receive network traffic such as data packets. In a particular embodiment, a communication interface 628 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 616 (e.g., manageability engine 626 or switch 630) and another device coupled to network 608. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 628 may allow communication of data (e.g., between the manageability engine 626 and the data center management platform 606) associated with management and monitoring functions performed by manageability engine 626. In various embodiments, manageability engine 626 may utilize elements (e.g., one or more NICs) of communication interfaces 628 to report the telemetry data (e.g., to system management platform 606) in order to reserve usage of NICs of communication interface 618 for operations associated with workloads performed by platform logic 610.

Switches 630 may couple to various ports (e.g., provided by NICs) of communication interface 628 and may switch data between these ports and various components of chipset 616 (e.g., one or more Peripheral Component Interconnect Express (PCIe) lanes coupled to CPUs 612). Switches 630 may be a physical or virtual (i.e., software) switch.

Platform logic 610 may include an additional communication interface 618. Similar to communication interfaces 628, communication interfaces 618 may be used for the communication of signaling and/or data between platform logic 610 and one or more networks 608 and one or more devices coupled to the network 608. For example, communication interface 618 may be used to send and receive network traffic such as data packets. In a particular embodiment, communication interfaces 618 comprise one or more physical NICs. These NICs may enable communication between any suitable element of platform logic 610 (e.g., CPUs 612 or memory 614) and another device coupled to network 608 (e.g., elements of other platforms or remote computing devices coupled to network 608 through one or more networks).

Platform logic 610 may receive and perform any suitable types of workloads. A workload may include any request to utilize one or more resources of platform logic 610, such as one or more cores or associated logic. For example, a workload may comprise a request to instantiate a software component, such as an I/O device driver 624 or guest system 622; a request to process a network packet received from a virtual machine 632 or device external to platform 602A (such as a network node coupled to network 608); a request to execute a process or thread associated with a guest system 622, an application running on platform 602A, a hypervisor 620 or other operating system running on platform 602A; or other suitable processing request.

A virtual machine 632 may emulate a computer system with its own dedicated hardware. A virtual machine 632 may run a guest operating system on top of the hypervisor 620. The components of platform logic 610 (e.g., CPUs 612, memory 614, chipset 616, and communication interface 618) may be virtualized such that it appears to the guest operating system that the virtual machine 632 has its own dedicated components.

A virtual machine 632 may include a virtualized NIC (vNIC), which is used by the virtual machine as its network interface. A vNIC may be assigned a media access control (MAC) address or other identifier, thus allowing multiple virtual machines 632 to be individually addressable in a network.

VNF 634 may comprise a software implementation of a functional building block with defined interfaces and behavior that can be deployed in a virtualized infrastructure. In particular embodiments, a VNF 634 may include one or more virtual machines 632 that collectively provide specific functionalities (e.g., WAN optimization, VPN termination, firewall operations, load-balancing operations, security functions, etc.). A VNF 634 running on platform logic 610 may provide the same functionality as traditional network components implemented through dedicated hardware. For example, a VNF 634 may include components to perform any suitable network function virtualization (NFV) workloads, such as virtualized evolved packet core (vEPC) components, mobility management entities (MMEs), 3rd Generation Partnership Project (3GPP) control and data plane components, etc.

SFC 636 is a group of VNFs 634 organized as a chain to perform a series of operations, such as network packet processing operations. Service function chaining may provide the ability to define an ordered list of network services (e.g., firewalls and load balancers) that are stitched together in the network to create a service chain.

A hypervisor 620 (also known as a virtual machine monitor) may comprise logic to create and run guest systems 622. The hypervisor 620 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 610. Services of hypervisor 620 may be provided by virtualizing in software or through hardware assisted resources that require minimal software intervention, or both. Multiple instances of a variety of guest operating systems may be managed by the hypervisor 620. Each platform 602 may have a separate instantiation of a hypervisor 620.

Hypervisor 620 may be a native or bare-metal hypervisor that runs directly on platform logic 610 to control the platform logic and manage the guest operating systems. Alternatively, hypervisor 620 may be a hosted hypervisor that runs on a host operating system and abstracts the guest operating systems from the host operating system. Hypervisor 620 may include a virtual switch 638 that may provide virtual switching and/or routing functions to virtual machines of guest systems 622. The virtual switch 638 may comprise a logical switching fabric that couples the vNICs of the virtual machines 632 to each other, thus creating a virtual network through which virtual machines may communicate with each other.

Virtual switch 638 may comprise a software element that is executed using components of platform logic 610. In various embodiments, hypervisor 620 may be in communication with any suitable entity (e.g., a SDN controller) which may cause hypervisor 620 to reconfigure the parameters of virtual switch 638 in response to changing conditions in platform 602 (e.g., the addition or deletion of virtual machines 632 or identification of optimizations that may be made to enhance performance of the platform).

Hypervisor 620 may also include resource allocation logic 644, which may include logic for determining allocation of platform resources based on the telemetry data (which may include stress information). Resource allocation logic 644 may also include logic for communicating with various components of platform logic 610 entities of platform 602A to implement such optimization, such as components of platform logic 610.

Any suitable logic may make one or more of these optimization decisions. For example, system management platform 606; resource allocation logic 644 of hypervisor 620 or other operating system; or other logic of computer platform 602A may be capable of making such decisions. In various embodiments, the system management platform 606 may receive telemetry data from and manage workload placement across multiple platforms 602. The system management platform 606 may communicate with hypervisors 620 (e.g., in an out-of-band manner) or other operating systems of the various platforms 602 to implement workload placements directed by the system management platform.

The elements of platform logic 610 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 602A may be coupled together in any suitable manner such as through one or more networks 608. A network 608 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 7:
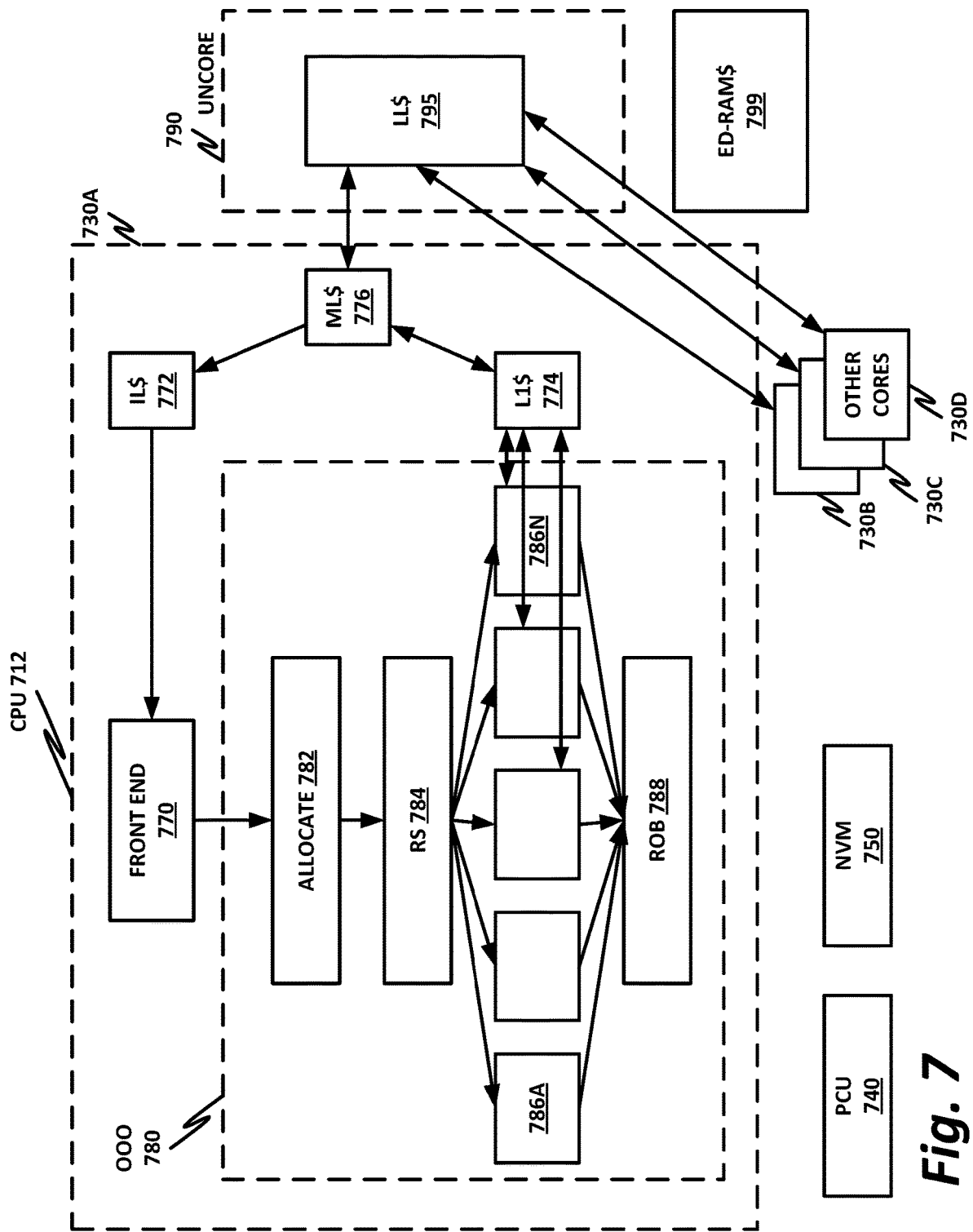
FIG. 7 is a block diagram of a central processing unit (CPU).

FIG. 7 illustrates a block diagram of a central processing unit (CPU) 712. Embodiments of CPU 712 may be configured or adapted to provide the method of providing a behavioral user security policy as disclosed in the present specification.

Although CPU 712 depicts a particular configuration, the cores and other components of CPU 712 may be arranged in any suitable manner. CPU 712 may comprise any processor or processing device, such as a microprocessor, an embedded processor, a DSP, a network processor, an application processor, a coprocessor, a system-on-a-chip (SoC), or other device to execute code. CPU 712, in the depicted embodiment, includes four processing elements (cores 730 in the depicted embodiment), which may include asymmetric processing elements or symmetric processing elements. However, CPU 712 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 730A includes an out-of-order processor that has a front end unit 770 used to fetch incoming instructions, perform various processing (e.g., caching, decoding, branch predicting, etc.) and passing instructions/operations along to an out-of-order (OOO) engine. The OOO engine performs further processing on decoded instructions.

A front end 770 may include a decode module coupled to fetch logic to decode fetched elements. Fetch logic, in one embodiment, includes individual sequencers associated with thread slots of cores 730. Usually, a core 730 is associated with a first ISA, which defines/specifies instructions executable on core 730. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 730, in one embodiment, recognize the same ISA (or a subset thereof). Alternatively, in a heterogeneous core environment, a decoder of one or more cores (e.g., core 730B) may recognize a second ISA (either a subset of the first ISA or a distinct ISA).

In the embodiment depicted, the OOO engine includes an allocate unit 782 to receive decoded instructions, which may be in the form of one or more micro-instructions or uops, from front end unit 770, and allocate them to appropriate resources such as registers and so forth. Next, the instructions are provided to a reservation station 784, which reserves resources and schedules them for execution on one of a plurality of execution units 786A-786N. Various types of execution units may be present, including, for example, arithmetic logic units (ALUs), load and store units, vector processing units (VPUs), and floating-point execution units, among others. Results from these different execution units are provided to a reorder buffer (ROB) 788, which take unordered results and return them to correct program order.

In the embodiment depicted, both front end unit 770 and OOO engine 780 are coupled to different levels of a memory hierarchy. Specifically shown is an instruction level cache 772, that in turn couples to a mid-level cache 776, that in turn couples to a last level cache 795. In one embodiment, last level cache 795 is implemented in an on-chip (sometimes referred to as uncore) unit 790. Uncore 790 may communicate with system memory 799, which, in the illustrated embodiment, is implemented via embedded DRAM (eDRAM). The various execution units 786 within OOO engine 780 are in communication with a first level cache 774 that also is in communication with mid-level cache 776. Additional cores 730B-730D may couple to last level cache 795 as well.

In particular embodiments, uncore 790 may be in a voltage domain and/or a frequency domain that is separate from voltage domains and/or frequency domains of the cores. That is, uncore 790 may be powered by a supply voltage that is different from the supply voltages used to power the cores and/or may operate at a frequency that is different from the operating frequencies of the cores.

CPU 712 may also include a power control unit (PCU) 740. In various embodiments, PCU 740 may control the supply voltages and the operating frequencies applied to each of the cores (on a per-core basis) and to the uncore. PCU 740 may also instruct a core or uncore to enter an idle state (where no voltage and clock are supplied) when not performing a workload.

In various embodiments, PCU 740 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 740 may detect stress characteristics at any suitable interval.

In various embodiments, PCU 740 is a component that is discrete from the cores 730. In particular embodiments, PCU 740 runs at a clock frequency that is different from the clock frequencies used by cores 730. In some embodiments where the PCU is a microcontroller, PCU 740 executes instructions according to an ISA that is different from an ISA used by cores 730.

In various embodiments, CPU 712 may also include a nonvolatile memory 750 to store stress information (such as stress characteristics, incremental stress values, accumulated stress values, stress accumulation rates, or other stress information) associated with cores 730 or uncore 790, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including CPU package. An SoC represents an integrated circuit (IC) that integrates components of a computer or other electronic system into a single chip. Thus, for example, client devices 110 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 510, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 550 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 520 and storage 550, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 510 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example a computing apparatus, comprising: a hardware platform including at least a processor and a memory; and a security agent comprising instructions encoded in the memory to instruct the processor to: monitor a user's operation of the computing apparatus over time, comprising determining whether a selected behavior is a security risk; provide a risk analysis of the user's operation based at least in part on the monitoring; select a scan sensitivity based at least in part on the risk analysis; and scan, with the selected sensitivity, one or more objects on the computing apparatus to determine if the one or more objects are a threat.

There is further disclosed an example computing apparatus, wherein the selected sensitivity is selected from a spectrum having a first terminus with high probability of detecting a threat and corresponding high probability of false positives, and a second terminus with relatively lower probability of detecting a threat and relatively lower probability of false positives.

There is further disclosed an example computing apparatus, wherein selecting a scan sensitivity comprises selecting a sensitivity based at least in part on an enumerated list of sensitivities.

There is further disclosed an example computing apparatus, wherein providing the risk analysis comprises computing an integer or floating-point risk analysis score.

There is further disclosed an example computing apparatus, wherein providing the risk analysis comprises comparing the integer or floating-point risk analysis to one or more risk thresholds.

There is further disclosed an example computing apparatus, wherein providing the risk analysis comprises applying machine learning to observed user behavior.

There is further disclosed an example computing apparatus, wherein providing the risk analysis comprises applying heuristic analysis to observed user behavior.

There is further disclosed an example computing apparatus, further comprising a network interface, wherein the security agent is further configured to provide anonymized risk analysis to a central authority via the network interface.

There is further disclosed an example computing apparatus, wherein the security agent is configured to compute a plurality of profiles for the user, and to select a first scan sensitivity according to a first profile and a second scan sensitivity according to a second profile.

There is further disclosed an example computing apparatus, wherein the security agent is configured to select, for a real-time scan, a sensitivity associated with an instant user profile.

There is further disclosed an example computing apparatus, wherein the security agent is configured to select, for a scheduled scan, a most sensitive scan sensitivity based at least in part on a plurality of scan sensitivities associated with a plurality of user profiles.

There is further disclosed an example computing apparatus, wherein monitoring the user's operation of the computing apparatus over time comprises monitoring one or more security factors.

There is further disclosed an example computing apparatus, wherein the one or more security factors is/are selected from the group consisting of websites visited, reputation of websites visited, content downloaded, reputation of content downloaded, stored cookies, user security settings, and use of browser incognito mode.

There is also disclosed an example of one or more tangible, non-transitory computer-readable mediums having stored thereon executable instructions to: monitor a security factor for a user, the security factor selected from websites visited, reputation of websites visited, content downloaded, reputation of content downloaded, stored cookies, user security settings, and use of browser incognito mode; based on the security factor, compute a risk factor of the user's operation of a computer; compare the risk factor to a threshold; and adjust the sensitivity of a security action according to the risk factor.

There is further disclosed an example of one or more tangible, non-transitory computer-readable mediums, wherein the security action is a file system scan.

There is further disclosed an example of one or more tangible, non-transitory computer-readable mediums, wherein the security action is a scheduled file system scan.

There is further disclosed an example of one or more tangible, non-transitory computer-readable mediums, wherein the security action is a real-time security scan.

There is further disclosed an example of one or more tangible, non-transitory computer-readable mediums, wherein the sensitivity is selected from a spectrum having a first terminus with high probability of detecting a threat and corresponding high probability of false positives, and a second terminus with relatively lower probability of detecting a threat and relatively lower probability of false positives.

There is further disclosed an example of one or more tangible, non-transitory computer-readable mediums, wherein selecting a sensitivity comprises a sensitivity selected from an enumerated list of sensitivities.

There is further disclosed an example of one or more tangible, non-transitory computer-readable mediums, wherein computing the risk factor comprises computing an integer or floating-point risk factor.

There is further disclosed an example of one or more tangible, non-transitory computer-readable mediums, wherein computing the risk factor comprises comparing the integer or floating-point risk analysis to one or more risk thresholds.

There is further disclosed an example of one or more tangible, non-transitory computer-readable mediums, wherein computing the risk factor comprises applying machine learning to observed user behavior.

There is further disclosed an example of one or more tangible, non-transitory computer-readable mediums, wherein computing the risk factor comprises applying heuristic analysis to observed user behavior.

There is further disclosed an example of one or more tangible, non-transitory computer-readable mediums, wherein the instructions are further to provide anonymized risk analysis to a central authority via a network interface.

There is further disclosed an example of one or more tangible, non-transitory computer-readable mediums, wherein the instructions are further to compute a plurality of profiles for the user, and to select a first sensitivity according to a first profile and a second sensitivity according to a second profile.

There is further disclosed an example of one or more tangible, non-transitory computer-readable mediums, wherein the instructions are further to select, for a real-time scan, a sensitivity associated with an instant user profile.

There is further disclosed an example of one or more tangible, non-transitory computer-readable mediums, wherein the instructions are further to select, for a scheduled scan, a most sensitive scan sensitivity based at least in part on a plurality of scan sensitivities associated with a plurality of user profiles.

There is also disclosed in an example a computer-implemented method of providing a behavioral user security policy, comprising: programmatically observing a user's network behavior over time; based on the observing, computing a risk factor of the user's operation of a computer, the risk factor based on an observed user behavior affecting network vulnerability; comparing the risk factor to a threshold; and adjusting an aggressiveness level of a security action according to the risk factor.

There is further disclosed an example method, wherein the security action is a file system scan.

There is further disclosed an example method, wherein the security action is a scheduled file system scan.

There is further disclosed an example method, wherein the security action is a real-time security scan.

There is further disclosed an example method, wherein the aggressiveness is selected from a spectrum having a first terminus with high probability of detecting a threat and corresponding high probability of false positives, and a second terminus with relatively lower probability of detecting a threat and relatively lower probability of false positives.

There is further disclosed an example method, wherein adjusting the aggressiveness comprises selecting an aggressiveness from an enumerated list of aggressiveness.

There is further disclosed an example method, wherein computing the risk factor comprises computing an integer or floating-point risk factor.

There is further disclosed an example method, wherein computing the risk factor comprises comparing the integer or floating-point risk analysis to one or more risk thresholds.

There is further disclosed an example method, wherein computing the risk factor comprises applying machine learning to observed user behavior.

There is further disclosed an example method, wherein computing the risk factor comprises applying heuristic analysis to observed user behavior.

There is further disclosed an example method, further comprising providing anonymized risk analysis to a central authority.

There is further disclosed an example method, further comprising computing a plurality of profiles for the user, and selecting a first aggressiveness according to a first profile and a second aggressiveness according to a second profile.

There is further disclosed an example method, further comprising selecting, for a real-time scan, an aggressiveness associated with an instant user profile.

There is further disclosed an example method, further comprising selecting, for a scheduled scan, a most sensitive scan aggressiveness from a plurality of scan sensitivities associated with a plurality of user profiles.

There is further disclosed an example method, wherein the observed user behavior affecting network vulnerability is selected from the group consisting of websites visited, reputation of websites visited, content downloaded, reputation of content downloaded, stored cookies, user security settings, and use of browser incognito mode.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed at least one computer-readable medium comprising instructions that, when executed, implement a method or realize an apparatus as claimed in a number of the above examples.

What is claimed is:

1. A computing apparatus, comprising:
a hardware platform including at least a processor and a memory; and
a security agent comprising instructions encoded in the memory to instruct the processor to:
monitor a human user's operation of the computing apparatus over time, comprising determining whether a selected interaction with the computing apparatus is a security risk;
provide a risk analysis of the human user's operation based at least in part on the monitoring, comprising computing a quantitative risk score, and comparing the quantitative risk score to a threshold to select a risk level for the human user;
select a scan sensitivity for a fuzzy match malware scan based at least in part on the risk level, wherein the scan sensitivity balances threat detection with false positives; and
scan, with the selected scan sensitivity, one or more objects on the computing apparatus to determine whether the one or more objects are a threat.

2. The computing apparatus of claim 1, wherein the selected sensitivity is selected from a spectrum having a first terminus with high probability of detecting a threat and corresponding high probability of false positives, and a second terminus with relatively lower probability of detecting a threat and relatively lower probability of false positives.

3. The computing apparatus of claim 1, wherein selecting a scan sensitivity comprises selecting a sensitivity based at least in part on an enumerated list of sensitivities.

4. The computing apparatus of claim 1, wherein providing the risk analysis comprises computing an integer or floating-point risk analysis score.

5. The computing apparatus of claim 4, wherein providing the risk analysis comprises comparing the integer or floating-point risk analysis to one or more risk thresholds.

6. The computing apparatus of claim 1, wherein providing the risk analysis comprises applying machine learning to observed user behavior.

7. The computing apparatus of claim 1, wherein providing the risk analysis comprises applying heuristic analysis to observed user behavior.

8. The computing apparatus of claim 1, further comprising a network interface, wherein the security agent is further configured to provide anonymized risk analysis to a central authority via the network interface.

9. The computing apparatus of claim 1, wherein the security agent is configured to compute a plurality of profiles for the human user, and to select a first scan sensitivity according to a first profile and a second scan sensitivity according to a second profile.

10. The computing apparatus of claim 9, wherein the security agent is configured to select, for a real-time scan, a sensitivity associated with an instant user profile.

11. The computing apparatus of claim 9, wherein the security agent is configured to select, for a scheduled scan, a most sensitive scan sensitivity based at least in part on a plurality of scan sensitivities associated with a plurality of user profiles.

12. The computing apparatus of claim 1, wherein monitoring the user's operation of the computing apparatus over time comprises monitoring one or more security factors.

13. The computing apparatus of claim 12, wherein the one or more security factors is/are selected from the group consisting of websites visited, reputation of websites visited, content downloaded, reputation of content downloaded, stored cookies, user security settings, and use of browser incognito mode.

14. One or more tangible, non-transitory computer-readable mediums having stored thereon executable instructions to:
monitor a security factor for a human user, the security factor selected from websites visited, reputation of websites visited, content downloaded, reputation of content downloaded, stored cookies, user security settings, and use of browser incognito mode;
based on the security factor, compute a risk factor of the human user's operation of a computer comprising computing a quantitative risk score, and comparing the quantitative risk score to a threshold to select a risk factor for the human user;
and
adjust a sensitivity of a security scan of a computer according to the risk factor, wherein the security scan comprises a fuzzy hash, and the sensitivity comprises a detection threshold of the fuzzy hash that balances threat detection with false positives.

15. The one or more tangible, non-transitory computer-readable mediums of claim 14, wherein the security scan is a file system scan.

16. The one or more tangible, non-transitory computer-readable mediums of claim 14, wherein the security scan is a scheduled file system scan.

17. The one or more tangible, non-transitory computer-readable mediums of claim 14, wherein the security scan is a real-time security scan.

18. A computer-implemented method of providing a behavioral user security policy, comprising:
programmatically observing a human user's network behavior over time;
based on the observing, computing a risk factor of the user's operation of a computer, the risk factor based on an observed user behavior affecting network vulnerability wherein computing the risk factor comprises computing a quantitative risk score, and comparing the quantitative risk score to a threshold to select a risk factor for the human user;
and
adjusting a detection threshold of a security scan according to the risk factor, wherein the security scan comprises a fuzzy hash and the detection threshold comprises a sensitivity of the fuzzy hash, wherein the sensitivity balances threat detection with false positives.

19. The method of claim 18, wherein the security scan is a file system scan.

20. The method of claim 18, wherein the detection threshold is selected from a spectrum having a first terminus with high probability of detecting a threat and corresponding high probability of false positives, and a second terminus with relatively lower probability of detecting a threat and relatively lower probability of false positives.

\* \* \* \* \*

UNITED STATES PATENT AND TRADEMARK OFFICE
CERTIFICATE OF CORRECTION

| | | |
|---|---|---|
| PATENT NO. | : 11,443,035 B2 | Page 1 of 1 |
| APPLICATION NO. | : 16/382349 | |
| DATED | : September 13, 2022 | |
| INVENTOR(S) | : Nitin Chhabra et al. | |

It is certified that error appears in the above-identified patent and that said Letters Patent is hereby corrected as shown below:

In the Drawings

Sheet 3 of 7, in "Fig. 3", Reference Numeral 300, Line 1, delete "EXEUCTIVE" and insert -- EXECUTIVE --, therefor.

In the Claims

In Column 28, Claim 18, Lines 59-60, delete "vulnerability" and insert -- vulnerability, --, therefor.

Signed and Sealed this
Twentieth Day of December, 2022

*Katherine Kelly Vidal*
Katherine Kelly Vidal
*Director of the United States Patent and Trademark Office*